(12) United States Patent
Heibel (10) Patent No.: US 11,715,577 B2
(45) Date of Patent: Aug. 1, 2023

(54) DETECTORS, SYSTEMS, AND METHODS FOR CONTINUOUSLY MONITORING NEUTRONS WITH ENHANCED SENSITIVITY

(71) Applicant: Westinghouse Electric Company LLC, Cranberry Township, PA (US)

(72) Inventor: Michael D. Heibel, Broomfield, CO (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 105 days.

(21) Appl. No.: 17/191,324

(22) Filed: Mar. 3, 2021

(65) Prior Publication Data

US 2022/0285040 A1  Sep. 8, 2022

(51) Int. Cl.
  *G21G 1/08*  (2006.01)
  *G01T 3/00*  (2006.01)
  *G21C 17/00* (2006.01)

(52) U.S. Cl.
  CPC ............... *G21G 1/08* (2013.01); *G01T 3/00* (2013.01); *G21C 17/00* (2013.01)

(58) Field of Classification Search
  CPC .. G21G 1/08; G01T 3/00; G01T 3/006; G21C 17/00; G21C 17/108; Y02E 30/30
  See application file for complete search history.

(56) References Cited

U.S. PATENT DOCUMENTS

| 10,438,708 B2 | 10/2019 | Heibel et al. |
| 2006/0043308 A1 | 3/2006 | McGregor et al. |

| 2012/0177166 A1* | 7/2012 | Seidel ............... G21C 17/108 376/254 |
| 2013/0083879 A1* | 4/2013 | Heibel ............... G21C 17/10 376/153 |
| 2014/0133620 A1* | 5/2014 | Krieg ............... G21D 3/04 376/254 |

(Continued)

FOREIGN PATENT DOCUMENTS

| CA | 1157578 A | 11/1983 |
| CN | 112099072 A | 12/2020 |
| DE | 3220959 A1 | 12/1982 |

OTHER PUBLICATIONS

Search Report for Taiwan Application No. 111107775, dated Jan. 28, 2023.

(Continued)

*Primary Examiner* — David P Porta
*Assistant Examiner* — Gisselle M Gutierrez
(74) *Attorney, Agent, or Firm* — K&L Gates LLP (57) ABSTRACT

A neutron detector is disclosed herein. The neutron detector can include a housing defining a cavity, wherein the housing is configured to permit an amount of neutrons emitted from a core of a nuclear reactor to enter the cavity. The neutron detector can also include an amount of a neutron sensitive material dispositioned within the cavity, wherein the neutron sensitive material is configured to generate and emit gamma rays upon interacting with the amount of neutrons. The neutron detector can further include an amount of electron emissive material configured to generate and emit a current of electrons upon interacting with the emitted gamma rays, wherein the current of electrons is indicative of the amount of neutrons emitted from the core of the nuclear reactor.

20 Claims, 5 Drawing Sheets

(56) References Cited

U.S. PATENT DOCUMENTS

| | | | |
|---|---|---|---|
| 2015/0055742 A1* | 2/2015 | Heibel | G01T 3/008 |
| | | | 376/254 |
| 2015/0206612 A1* | 7/2015 | Heibel | G21C 9/00 |
| | | | 376/347 |
| 2017/0192113 A1* | 7/2017 | Rhiger | G01T 1/24 |
| 2019/0385757 A1* | 12/2019 | Heibel | G21H 1/04 |
| 2019/0385758 A1* | 12/2019 | Heibel | G21C 11/022 |

OTHER PUBLICATIONS

International Search Report and Written Opinion for International PCT Application No. PCT/US2022/070899, dated Aug. 12, 2022.
Sovka, Response of Cobalt Neutron Flux Detectors, Research Report of the Atomic Energy of Canada (Jan. 1, 1969), pp. 1-31.

\* cited by examiner

DETECTORS, SYSTEMS, AND METHODS FOR CONTINUOUSLY MONITORING NEUTRONS WITH ENHANCED SENSITIVITY

FIELD

The present disclosure is generally related to nuclear power generation and, more particularly, is directed to improved apparatuses, systems, and methods for continuously detecting neutrons emitted from a core of a nuclear reactor with enhanced sensitivity.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, a neutron detector is disclosed. The neutron detector can include a housing defining a cavity and the housing can be configured to permit an amount of neutrons emitted from a core of a nuclear reactor to enter the cavity. The neutron detector can also include an amount of a neutron sensitive material dispositioned within the cavity. The neutron sensitive material can be configured to generate and emit gamma rays upon interacting with the amount of neutrons. The neutron detector can further include an amount of electron emissive material. The electron emissive material can be configured to generate and emit a current of electrons upon interacting with the emitted gamma rays. The current of electrons can be indicative of the amount of neutrons emitted from the core of the nuclear reactor.

In various aspects, a system configured to detect neutrons is disclosed. The system can include a neutron detector. The neutron detector can include a housing that defines a cavity and the housing can be configured to permit an amount of neutrons emitted from a core of a nuclear reactor to enter the cavity. An amount of a neutron sensitive material can be dispositioned within the cavity, and the neutron sensitive material can be configured to generate and emit gamma rays upon interacting with the amount of neutrons. The neutron detector can further include an amount of electron emissive material. The electron emissive material can be configured to generate and emit a current of electrons upon interacting with the emitted gamma rays. The current of electrons can be indicative of the amount of neutrons emitted from the core of the nuclear reactor. The neutron detector can also include a signal lead, which can be configured to generate a signal associated with the current of electrons. The system can further include a monitoring subsystem communicably coupled to the neutron detector, wherein the monitoring subsystem includes a control circuit configured to: receive the signal generated by the signal lead; determine a magnitude of the current of electrons based, at least in part, on the signal received from the signal lead; and determine the amount of neutrons emitted from the core of the nuclear reactor based, at least in part, on the determined magnitude of the current of electrons.

In various aspects, a method of detecting neutrons emitted from a core of a nuclear reactor is disclosed. The method can include causing an interaction between an amount of neutrons emitted from the core and a neutron sensitive material; generating, via the interaction, gamma rays to be emitted towards an electron emissive material; causing an interaction between the emitted gamma rays and the electron emissive material; generating, via the interaction, a current of electrons indicative of the amount of neutrons emitted from the core; determining a magnitude of the generated current of electrons; and determining the amount of neutrons emitted from the core based, at least in part, on the determined magnitude of the generated current of electrons.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

DETAILED DESCRIPTION

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims. Furthermore, it is to be understood that such terms as "forward", "rearward", "left", "right", "upwardly", "downwardly", and the like are words of convenience and are not to be construed as limiting terms. Furthermore, it is to be understood that such terms as "forward", "rearward", "left", "right", "upwardly", "downwardly", and the like are words of convenience and are not to be construed as limiting terms.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Before explaining various aspects of the articulated manipulator in detail, it should be noted that the illustrative examples are not limited in application or use to the details of disclosed in the accompanying drawings and description. It shall be appreciated that the illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Specifically, it shall be appreciated that any discussion of compact nuclear reactors (e.g., eVinci) are merely illustrative and intended to illustrate new and emerging challenges that will necessitate improved means of detecting neutrons external to the core of a nuclear reactor. Accordingly, it shall be appreciated that the apparatuses and methods disclosed herein can be applied to continuously detect neutrons external to any nuclear reactor. For example, the systems and methods disclosed herein can be applied to continuously detect neutrons external to a MAGNOX reactor, a CANDU reactor, a light-water reactor (LWR), an advanced-gas cooled (AGR) reactor, a high-powered channel-type reactor (RBMK), a low-enriched uranium (LEU) fueled reactor, and/or a highly-enriched uranium (HEU)-fueled reactor, amongst others.

Additionally, it shall be appreciated that the apparatuses and methods disclosed herein can be implemented as components of any number of systems and/or subsystems associated with a nuclear reactor and/or plant. Accordingly, it shall be appreciated that, according to some non-limiting aspects of the present disclosure, the apparatuses and/or methods disclosed herein can be implemented in conjunction with a control circuit, a memory, and/or user interface, as well as any number of other sensors to produce an accurate and comprehensive assessment of the core of a nuclear reactor under any of a number of different operating protocols. Some non-limiting aspects include a system configured to autonomously operate the nuclear reactor based on signals received from the neutron detector disclosed herein. As such, the present disclosure shall not bet construed as limited to apparatuses and/or methods.

Ex-core nuclear instrumentation can be implemented to detect neutron leakage from the core of a nuclear reactor. Accurately measuring the amount of neutron flux that has escaped from a core can be useful for a number of reasons. For example, a measurement of neutrons external to the core can be directly proportional to the neutron flux within the core and thus, the power level of a reactor can be determined via measurements taken by an ex-core detector. Additionally, it can be much easier to design and maintain neutron detectors external to the core, without having to accommodate for the hostile environments typically found within the nuclear reactor, itself.

However, nuclear reactors continue to decrease in size, simultaneously expanding the number of applications for nuclear energy and reducing the operating power expected of the reactor, which in turn can increase the length of a reactor's operating cycle. Compact reactors (e.g., eVinci) can work longer in an increasing number of commercial environments and contexts. These circumstances can result in extreme conditions (e.g., longer duration of use, increased temperatures) under which conventional detectors suffer from the sensitivity and longevity required to continuously measure the fission rate (power).

Specifically, conventional detectors cannot accurately detect a neutron flux within a compact reactor at the relatively low power levels generated during reactor startup and shutdown protocols. Furthermore, conventional detectors are generally complex and inherently unsuitable for compact reactors, which are intended to promote simplicity and efficiency in commercial applications. Accordingly, there is a need for improved apparatuses and methods for continuously monitoring neutron flux with enhanced sensitivity Referring now to FIG. 1, a sectioned side view of a neutron detector 100 configured to continuously detect neutrons emitted from the core of a nuclear reactor is depicted in accordance with at least one non-limiting aspect of the present disclosure. The neutron detector 100 can be positioned external to the core of the nuclear reactor. According to the non-limiting aspect of FIG. 1, the neutron detector 100 can include a housing 102 the defines a cavity. A layer of neutron sensitive material 104 and an electron emissive material 106 can be dispositioned within the cavity defined by the housing 102. The housing 102 can be composed of a neutron collecting material, meaning it can permit an amount of neutrons emitted from a core of a nuclear reactor to enter the cavity. As such, the housing 102 material can be determined based on a preferred penetration of neutrons 110, which—once inside the cavity—can catalyze detection via a series of ensuing interactions, as will be discussed herein.

Figure 1:
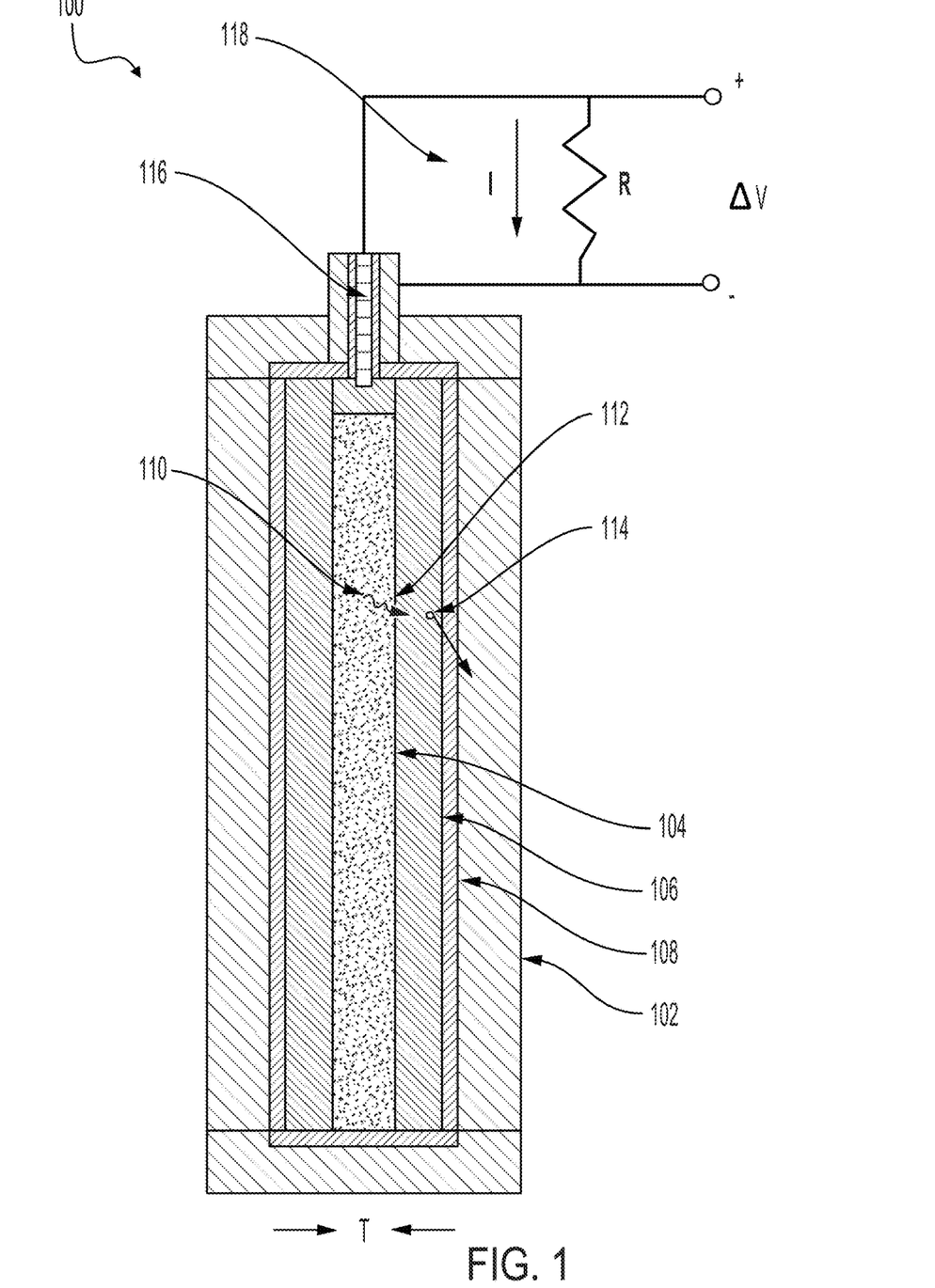
FIG. 1 illustrates a sectioned side view of a neutron detector configured to continuously detect neutrons emitted from the core of a nuclear reactor, in accordance with at least one non-limiting aspect of the present disclosure.

The housing 102 of FIG. 1 can be made of a low atomic number (Z)—or number of protons in its nucleus—to facilitate a desired amount of neutron penetration into the cavity. For example, the housing 102 can include a material such as Zirconium. According to other non-limiting aspects, the housing 102 can include a hydrogenous material such as paraffin or polyethylene. However, according to other non-limiting aspects of the present disclosure, the housing can be constructed of many different materials that facilitate a desired amount of neutron penetration. In still other non-limiting aspects, the housing 104 can be geometrically modified to achieve a preferred admission of neutrons into the cavity. Accordingly, it shall be appreciated that the housing 102 material and/or geometry can be modified according to user preference and/or intended application. For illustrative purposes, FIG. 1 depicts a thermal neutron 110 within the cavity defined by the housing 102 of the neutron detector 100.

Figure 3A:
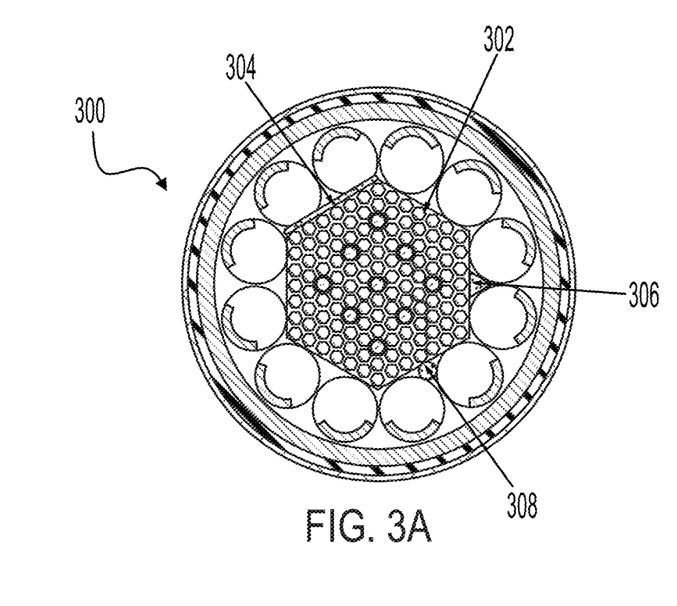
FIG. 3A illustrates a nuclear reactor featuring several improved neutron detectors of varying geometric configurations, in accordance with at least one non-limiting aspect of the present disclosure.

In further reference to FIG. 1, the housing 102 can be specifically configured with a preferred geometric shape and/or cross sectional geometry. The neutron detector 100 and, more specifically, the housing 102 of FIG. 1 can be configured as a cylinder. However, it shall be appreciated that, according to other non-limiting aspects, the neutron detector 100 can be configured with any cross section and/or shape. For example, if the neutron detector 100 is implemented to monitor neutron emissions from a compact reactor, it may be beneficial to configure the neutron detector 100 with a plate-like geometry, as will be describe in reference to FIG. 3.

Still referring to FIG. 1, the neutron sensitive material 104 can include any material capable of interacting with a thermal neutron 110 within the cavity of the housing 102 to produce a gamma ray 112 capable of traversing through the electron emissive material 106. For example, the neutron sensitive material 104 can include an isotope such as Gadolinium 157, or $^{157}$Gd. Assuming the neutron sensitive material includes $^{157}$Gd, it can produce a meta-stable nucleus, such as Gadolinium 158m, or $^{158m}$Gd, upon interacting with a thermal neutron 110. As the meta-stable nucleus decays to a ground state, it can generate and emit gamma rays 112 that traverse through the neutron sensitive material 104 towards the electron emissive material 106. Although the non-limiting aspect of FIG. 1 contemplates a neutron sensitive material 104 that utilizes isotopes such as $^{157}$Gd and $^{158m}$Gd to generate and emit gamma rays 112 into the electron emissive material 106, it shall be appreciated that any isotope capable of producing gamma rays 112 in a similar fashion can be implemented to achieve a similar effect. Specifically, the present disclosure contemplates any isotopes with a sufficient atomic number and/or neutron-absorptive cross-section to efficiently produce gamma rays.

Additionally, the neutron sensitive material 104 of FIG. 1 can be selected based on a desirable reaction cross section—different from its geometric cross section—such that the neutron detector 100 possesses a desired sensitivity. For example, according to the non-limiting aspect of FIG. 1, the neutron sensitive material (e.g., $^{157}$Gd) can include a reaction cross section of approximately $2.5 \times 10^5$ barns (or $2.5 \times 10^{-27}$ m$^2$). Relatively speaking, this is significantly larger than the corresponding cross sections of boron-10 and Uranium 235, or $^{235}$U, as is used in conventional ex-core neutron detectors. Accordingly, the neutron detector 100 of FIG. 1 can generate significantly more neutron interactions than conventional devices, which can increase the interaction rate of gamma rays in the electron emissive material 106, as will be discussed. This imbues the neutron detector 100 of FIG. 1 with an increased sensitivity, which represents just one of the many technological improvements it can provide.

According to the non-limiting aspect of FIG. 1, the gamma ray 112 can subsequently traverse the neutron sensitive material 104 and into the electron emissive material 106. The electron emissive material 106 can be selected based on a desired ability to generate one or more electrons 114 upon interacting with the gamma rays 112 generated and emitted by the neutron sensitive material 104. The electrons 114 generated and emitted by the electron emissive material 106 can have a sufficient (e.g., high enough) energy to constitute delta radiation—or radiation capable of escaping a primary source of radiation by a significant distance. In other words, the electron emissive material 106 can produce a measurable current of electrons 114 that is proportional—and generated in response—to an amount of gamma rays produced by the neutron sensitive material 104. For example, according to the non-limiting aspect of FIG. 1, the electron emissive material 106 can be a layer of Tungsten. However, according to other non-limiting aspects, the electron emissive material 106 can include any number of electron emissive materials to accomplish a similar effect.

In further reference to FIG. 1, the neutron detector 100 can further include an electrically insulating material 108 configured to allow the traversal of the current of electrons 114 generated and emitted by the electron emissive material 106. Specifically, the electrically insulating material 106 can be selected to ensure the current of electrons 114, or delta rays, has sufficient energy to traverse it to the housing 102. For example, the electrically insulating material 108 can include aluminum-oxide and/or magnesium-oxide, although other electrically insulating materials 108 can be used to achieve a similar effect. In contrast, the housing 102, or neutron collecting layer, can be selected to prevent the current of electrons 114 from traversing through it. As such, the electrically insulating material 108 and housing 102 can collective contain the current of electrons 114 generated and emitted by the electron emissive material 106 to the cavity of the housing 102. According to the non-limiting aspect of FIG. 1, the neutron detector 100 can further include a signal lead 116 configured to route the current of electrons 114 and/or a signal associated with the current of electrons 114 out of the cavity defined by the housing 102. According to some non-limiting aspects, the neutron detector 100 can be further configured to process the current of electrons 114 into a signal suitable for transmission and further processing.

Since the neutron detector 100 of FIG. 1 continuously generates electrical current 114, the signal lead 116 can be electrically coupled to a circuit 118, which can put the resulting electrical power to productive use. For example, as will be discussed in reference to FIG. 4, the current of electrons 114 can be used to electrically power one or more transmitters 406 (FIG. 4) configured to transmit an electrical signal from the neutron detector 100 to a monitoring subsystem for further processing, reporting, and/or subsequent actions. The power generated by the neutron detector 100 can have a magnitude determined by the magnitude of the current of electrons 114 multiplied by a predetermined voltage, as produced by the circuit 118 based, at least in part, by a predetermined resistive load R.

According to the non-limiting aspect of FIG. 1, a magnitude of the current of electrons 114 generated by the electron emissive material 106 can be indicative of an amount of neutrons 110 that penetrated the housing 102 and interacted with the neutron sensitive material 104. As such, the magnitude of the current of electrons 114 can be used to determine an amount of thermal neutrons 110 that were emitted by the core of the nuclear reactor during a specified period of time. As will be discussed, a system 400 (FIG. 4) can include a neutron detector 400 (FIG. 4) similar to the neutron detector 100 of FIG. 1 to continuously monitor and characterize the performance of a nuclear reactor based, at least in part, on the generated current of electrons. For example, a system 200 (FIG. 2) can be configured to determine a neutron flux surrounding the nuclear reactor as well as a power output of the core.

The design of the neutron detector 100 of FIG. 1 can be scaled and/or attenuated to optimize performance. For example, the neutron sensitive material 104 can be geometrically configured such that the neutron detector 100 of FIG. 1 possesses a desired sensitivity. According to the non-limiting aspect of FIG. 1, the neutron sensitive material 104 of FIG. 1 can be configured to include a thickness T, which can be specifically determined based, at least in part, on a desired sensitivity for the neutron detector 100. The amount of the neutron sensitive material 104 dispositioned within the cavity of the housing 102 can be directly proportional to the intensity and frequency of the gamma rays generated and thus, can be increased to enhance the sensitivity of the neutron detector 100. As such, the thickness T can be increased to enhance neutron detector 100 sensitivity based on user preference and/or intended application. Accordingly, the design of the neutron detector 100 of FIG. 1 can be easily scalable and thus, optimized for innumerable applications and environments that would be otherwise infeasible for conventional detectors.

Additionally and/or alternatively, the neutron sensitive material 104 can be geometrically configured such that the neutron detector 100 of FIG. 1 is capable of performing with accuracy over a desired operating life. For example, the thickness can be similarly configured such that the neutron detector 100 can perform over the increased lifetimes expected of compact reactors. Accordingly, the neutron sensitive material 104 can be resilient and unaffected by depletion and thus, more resilient to the parasitic absorption suffered by conventional detectors when exposed to thermal neutrons for an extended period of time. Accordingly, the neutron detector 100 of FIG. 1 is robust and will be relatively unaffected by core reactivity balance.

Figure 2:
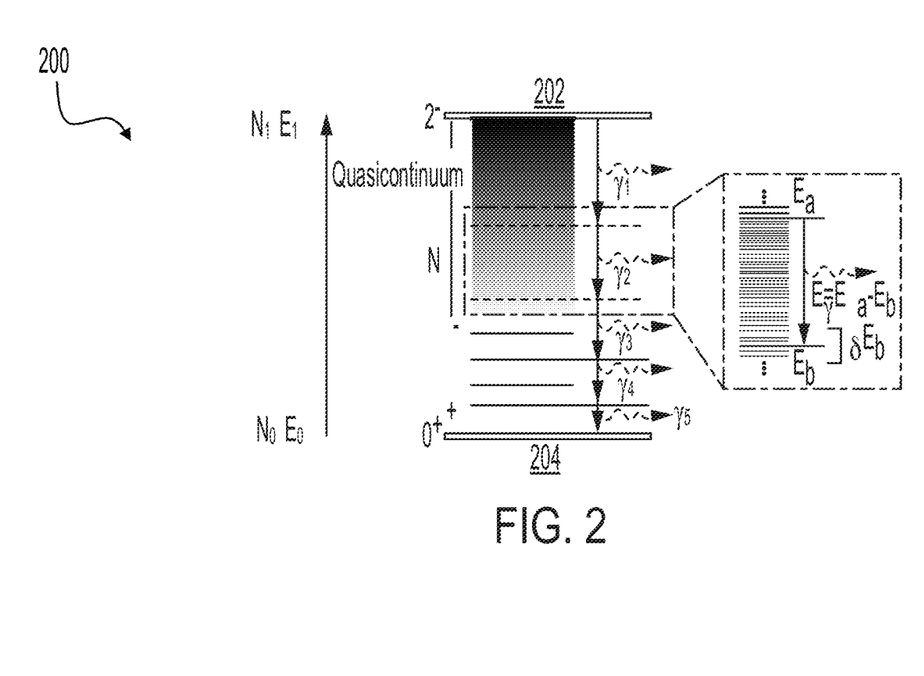
FIG. 2 illustrates a chart illustrating the transition of a neutron sensitive material to a meta-stable nucleus, in accordance with at least one non-limiting aspect of the present disclosure.

Referring now to FIG. 2, a chart 200 illustrating the transition of a neutron sensitive material 202 to a meta-stable nucleus 204 is depicted in accordance with at least one non-limiting aspect of the present disclosure. For example, according to the non-limiting aspect of FIG. 2, the neutron sensitive material 202 can be $^{157}$Gd dispositioned within a nuclear detector, such as the neutron detector 100 of FIG. 1. The neutron sensitive material 202, in its capture state, can have an initial excitation energy $E_1$ and an initial nuclear density level $N_1$—or a specific energy and density prior to interacting with a thermal neutron emitted from a core of a nuclear reactor. For example, according to the non-limiting aspect of FIG. 2, the neutron sensitive material 202 can have an initial excitation energy of approximately 7937 keV. As is depicted in FIG. 2, the neutron sensitive material 202, upon interacting with the thermal neutron, can produce a meta-stable nucleus 204 with a final excitation energy $E_0$ that is lower than the initial excitation energy $E_1$ and a final nuclear density level $N_0$ that is lower than the initial nuclear density level $N_1$. For example, according to the non-limiting aspect of FIG. 2, the meta-stable nucleus 204 can be $^{158m}$Gd and the initial excitation energy can decay to 0 keV.

According to the non-limiting aspect of FIG. 2, the decay of the capture state neutron sensitive material 202 to a meta-stable nucleus 204 can result in the generation and emission of one or more gamma rays $\gamma_1$, $\gamma_2$, $\gamma_3$, $\gamma_4$, and $\gamma_5$. As nuclear sensitive material 202, in its capture state, decays to the meta-stable ground state 204, certain nuclear characteristics (e.g., excitation, spin) can transition between resolvable and unresolvable—or quasicontinuum—levels. As illustrated in FIG. 2, this variation occurs as the excitation energy and nuclear level density decreases. At any point during the decomposition, a first excitation energy level $E_a$ in the nucleus can transition to a lower excitation energy level $E_b$, thereby emitting a resulting gamma ray $\gamma_2$. The resulting gamma ray energy $E_\gamma$ possesses an energy that is comparable to an energy differential, or $E_a$-$E_b$. This reaction continues as the excitation energy and nuclear density level decrease to their respective ground states, $E_0$, $N_0$. In other words, as the capture state neutron sensitive material 202 decays and its excitation energy and nuclear density level decreases, the changing composition within its nucleus can ultimately result in the generation and emission of gamma rays $\gamma_1$, $\gamma_2$, $\gamma_3$, $\gamma_4$, and $\gamma_5$.

Although the non-limiting aspect of FIG. 2 contemplates a neutron sensitive material 204 that utilizes isotopes such as $^{157}$Gd and $^{158m}$Gd to generate and emit gamma rays $\gamma_1$, $\gamma_2$, $\gamma_3$, $\gamma_4$, and $\gamma_5$, it shall be appreciated that any isotope capable of similar nuclear composition and characterization can be implemented to achieve a similar effect.

Referring now to FIG. 3A, a nuclear reactor 300 featuring several improved neutron detectors 304, 306, 308 of varying geometric configurations is depicted in accordance with at least one non-limiting aspect of the present disclosure. The non-limiting aspect of FIG. 3A, the nuclear reactor 300 can be a compact reactor (e.g., eVinci) with a core 302. According to the non-limiting aspect of FIG. 3A, a series of improved neutron detectors 304, 306, 308 can be positioned external to the core for continual monitoring. As previously discussed, the neutron detector 100 of FIG. 1 can be geometrically configured based on user preference and/or intended application. Accordingly, each of the improved neutron detectors 304, 306, 308 of FIG. 3A includes a different geometric configuration.

For example, if the first neutron detector 304 of FIG. 3A includes a plate-like configuration and is depicted as running the length of one of the sides of the hexagonal core 302. The second neutron detector 306 of FIG. 3A includes a triangular configuration with at least one of its sides forward facing another side of the hexagonal core 302. The third neutron detector 308 of FIG. 3A includes a cylindrical configuration with at least one of its sides positioned tangentially relative to yet another side of the hexagonal core 302. It shall be appreciated that any such detector 304, 306, 308 configurations can be implemented according to user preference and/or intended application.

Volumetric, thermal, and/or radiation constraints may necessitate one such detector 304, 306, 308 over another. For example, according to the non-limiting aspect of FIG. 3A, the plate-like detector 304, positioned just outside the exterior vertical face of the reactor core, could be preferable, as it could optimize the forward facing surface for neutron capture. Nonetheless, the alternate detector 306, 308 configurations depicted in FIG. 3A could be implemented to conform to the specific reactor 300 and/or core 302 design. Specifically, the detector 304, 306, 308 configuration can be selected to optimize the mechanical and/or nuclear response of the reactor 302 and/or detector 304, 306, 308 to achieve a specific reading and/or reduce the possibility of interference.

For example, the reactor 300 of FIG. 3A can be segmented into multiple sections with any number of detectors 304, 306, 308 of varying geometric configurations, with each positioned to cover only a fraction of the core 302 height. This configuration can produce an optimal and accurate measure of reactor 300 power generation, especially if the reactor 300 is axially dependent. Multiple plate-like detectors 304 can be configured to completely surround the core 302, which can maximize the sensitivity of detection. Although a compact reactor 300 (eVinci) and core 302 is depicted in FIG. 3A, it shall be appreciated that any of the detector 304, 306, 308 configurations can be implemented in any other nuclear reactor, regardless of its specific design or geometry. According to the non-limiting aspect of FIG. 3, a first detector 304, second detector 306, and third detector 308 are implemented with a plate-like, triangular, and cylindrical geometry, respectively. However, it shall be appreciated that any number of detectors can be implemented with innumerable geometric shapes, depending on user preference and/or intended application.

Figure 3B:
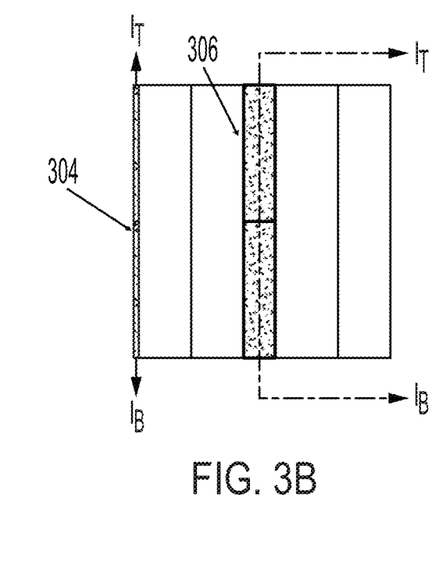
FIG. 3B illustrates a sectioned side view of the nuclear reactor of FIG. 3A, in accordance with at least one non-limiting aspect of the present disclosure.

Referring now to FIG. 3B, a sectioned side view of the nuclear reactor 300 of FIG. 3A is depicted in accordance with at least one non-limiting aspect of the present disclosure. According to the non-limiting aspect of FIG. 3B, the first neutron detector 304, the second neutron detector 304, and the third neutron detector 304 can be vertically positioned along a length $I_{T,B}$ of the nuclear reactor 300 core 302 to achieve an optimal measurement of the nuclear reactor 300 power distribution. Although the first, plate-like neutron detector 304 is configured to run the entire vertical length of the core 302, extending from top $I_T$ to bottom $I_B$, the second neutron detector 306 and third neutron detector 308 are alternately positioned, with the second, triangular neutron detector 306 closer to the top $I_T$ and the third, cylindrical neutron detector 308 closer to the bottom $I_B$. Experimental measurements conducted at the Breazeale nuclear reactor indicate that the effective sensitivity of a similar configuration is approximately 1.2×10−19 Amps/mg of $^{157}$Cd/surface area of Delta-ray emitter in cm²/thermal neutron flux intensity. However, it shall be appreciated that the non-limiting aspect of FIG. 3B is just one such configuration contemplated by the present disclosure.

For example, if the neutron detectors 304, 306, 308 were configured to completely covers a core 302 face of the reactor 300, assuming a $^{157}$Gd, a density of 50 mg/cm², a thermal neutron flux of 1×108 neutrons/cm²/second, and a delta-ray emitter surface area of 745.2 cm², the electric current produced is estimated to be approximately 300 microamperes. This is well within the measurement capabilities of the commercially available electronics, which will be discussed in reference to the system 400 of FIG. 4, to continuously monitor the neutron flux generated by the nuclear reactor 300, external to the core 302. Accordingly, a configuration of neutron detectors 304, 306, 308, such as that depicted in FIG. 3B, can be implemented to obtain accurate measurements of neutron flux at very low power levels. As such, the configuration of neutron detectors 304, 306, 308 of FIG. 3B provides a technological improvement over known devices, allowing a significant reduction in both the cost and complexity typically associated with conventional ex-core detectors. This improvement is not only limited to the continuous measurement of conventions reactors, but will be instrumental in the monitoring of future reactor designs.

Figure 4:
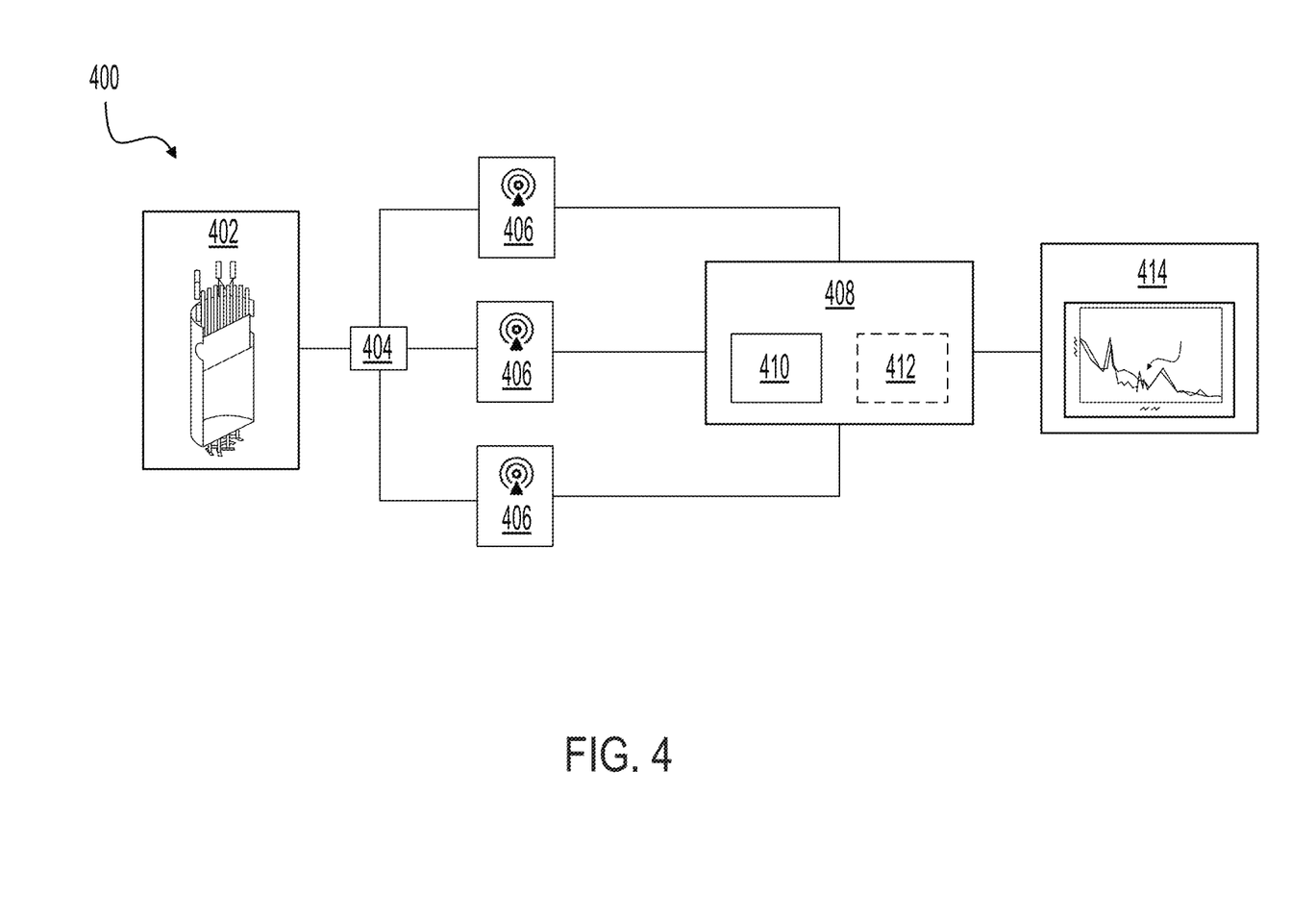
FIG. 4 illustrates a system configured to continuously monitor the core of a nuclear reactor, in accordance with at least one non-limiting aspect of the present disclosure.

Referring now to FIG. 4, a system 400 configured to continuously monitor the core of a nuclear reactor 402 is depicted in accordance with at least one non-limiting aspect of the present disclosure. According to the non-limiting aspect of FIG. 4, the system 400 can include a neutron detector 400 positioned external to the core of the nuclear reactor 402 and communicably coupled to a monitoring subsystem 408. As used herein, the term "communicably coupled" shall include any configuration in which signals can be transmitted between the neutron detector 404 and the monitoring subsystem 408. This shall include any means of wired and/or wireless communication—both infrastructure and ad hoc. Accordingly, the neutron detector 404 and monitoring subsystem 408 can be communicably coupled via a variety of connections, including, but not limited to: local area network (LAN), coaxial cable, radiofrequency (RF) transmission, infrared, WiFi®, Bluetooth®, near-field communications (NFC), and/or cellular network, amongst others. Additionally and/or alternatively, it shall be appreciated that the connection can include any intermediate systems, subsystems, and/or components between the neutron detector 404 and monitoring subsystem 408. According to the non-limiting aspect of FIG. 400, the monitoring subsystem 408 can be located within the same facility as the nuclear reactor 402 and neutron detector 404. However, according to other non-limiting aspects, the monitoring subsystem 408 can be remotely located relative to the nuclear reactor 402.

In further reference to FIG. 4, the neutron detector 404 and monitoring subsystem 408 can be communicably coupled via one or more transmitters 406. According to the non-limiting aspect of FIG. 4, the neutron detector 404 can be similarly configured to the neutron detector 100 of FIG. 1. In other words, the neutron detector 404 can include a neutron sensitive material and electron emissive material collectively configured to generate a current of electrons which can be transmitted through a signal lead. As was previously discussed, the neutron detector 404 can essentially function as a continual source of electrical currents 114 (FIG. 1). Thus, according to some non-limiting aspects, the neutron detector 404 can be electrically coupled to the one or more transmitters 406 and the current of electrons it generates can be used to electrically power the one or more transmitters 406 without affecting the measurable magnitude of the current itself. Accordingly, the system 400 of FIG. 4 can reduce the amount cabling and reactor penetration needs required to support its operation. This allows the neutron detectors 404 contemplated by the present disclosure to replace conventional ex-core detectors in a non-invasive way.

Still referring to FIG. 4, the monitoring subsystem 408 can include a control circuit 410 configured to receive signals from the neutron detector 404. According to the non-limiting aspect of FIG. 4, the control circuit 410 can receive signals from the neutron detector 404 via the one or more transmitters 406. Upon receiving the signal from the neutron detector 404, the control circuit 410 can be configured to determine and number of metrics associated with the nuclear reactor 402. For example, according to the non-limiting aspect of FIG. 4, the control circuit 410 can be configured to determine a magnitude of the current of electrons based, at least in part, on the signal received from the neutron detector 404 and subsequently determine the amount of neutrons emitted from the core of the nuclear reactor 402 based, at least in part, on the determined magnitude of the current of electrons. According to other non-limiting aspects, the control circuit 410 can be further configured to determine a neutron flux of the nuclear reactor 402 based, at least in part, on the determined amount of neutrons emitted from the core of the nuclear reactor; and to subsequently determine a power output of the nuclear reactor 402 based, at least in part, on the determined neutron flux of the nuclear reactor. Of course, it shall be appreciated that the control circuit 410 can determine and number of characteristic based on signals received from the neutron detector 404 to characterize the nuclear reactor 402 and/or its operation depending on the intended application.

According to some non-limiting aspects, the monitoring subsystem 408 of FIG. 4 can further include a memory 412 configured to store historical information associated with nuclear reactor 402 and/or similar nuclear reactors. As such, the control circuit 410 can be further configured to access stored information from the memory 412 to contextualize information it determines based on the signal and thus, refine its characterization of the nuclear reactor 402. Although some non-limiting aspects contemplate the memory 412 as a part of the monitoring subsystem 408, according to other non-limiting aspects, the memory 412 can be remotely located and accessed by the control circuit 410. In some non-limiting aspects, the monitoring subsystem 408 can include any commercial off the shelf range monitors, such as the PRM 501™ by Radiation Monitoring Systems Division and/or the like. However, it shall be appreciated that the control circuit 410 can be custom configured to provide similar—if not improved—functionality depending on user preference and/or intended application.

In further reference to FIG. 4, the system 400 can further include a user interface 414 communicably coupled to the monitoring subsystem 408. The user interface can be configured to display the information determined by the control circuit 410 based on the signals received from the neutron detector 404. According to the non-limiting aspect of FIG. 414, the user interface can be a separate hardware component configured to sit adjacent to the monitoring subsystem 408. However, in some non-limiting aspects, the user interface 414 can include be configured as a platform that can be remotely accessed from any computer and/or mobile device, thereby improving accessibility. Additionally and/or alternatively, the user interface 414 can be configured to display and alarm including any combination of visual, audible, and/or haptic indicators informing technicians of the nuclear reactor 402 of its current condition, providing recommendations based on historical information stored in the memory 412, and/or autonomously operating the nuclear reactor 402 and informing the technician of actions taken by the monitoring subsystem 408. For example, in some non-limiting aspects, the monitoring subsystem 408 can be configured to shut down the nuclear reactor 402 if the determined power level of the nuclear reactor 402 exceeds a predetermined threshold for a specified period of time.

Figure 5:
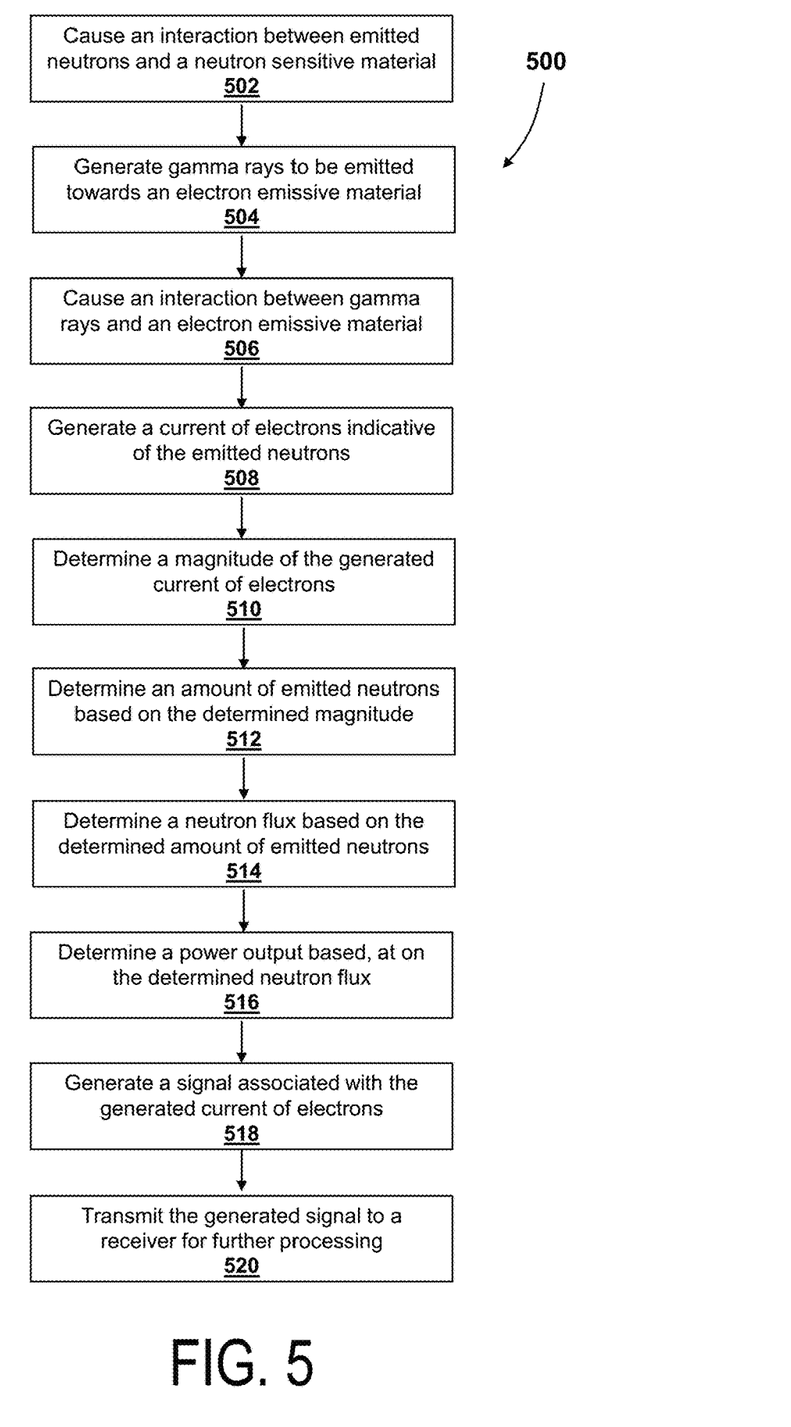
FIG. 5 illustrates a method of detecting neutrons emitted from a core of a nuclear reactor, in accordance with at least one non-limiting aspect of the present disclosure Corresponding reference characters indicate corresponding parts throughout the several views. The exemplifications set out herein illustrate various aspects of the invention, in one form, and such exemplifications are not to be construed as limiting the scope of the invention in any manner.

Referring now to FIG. 5, a method 500 of detecting neutrons emitted from a core of a nuclear reactor is depicted in accordance with at least one non-limiting aspect of the present disclosure. According to the non-limiting aspect of FIG. 5, the method 500 can include causing an interaction between an amount of neutrons emitted from the core and a neutron sensitive material 502 and generating, via the interaction, gamma rays to be emitted towards an electron emissive material 504. Subsequently, the method can include causing an interaction between the emitted gamma rays and the electron emissive material 506 and generating, via the interaction, a current of electrons indicative of the amount of neutrons emitted from the core 508. After the current of electrons is generated, the method can include determining a magnitude of the generated current of electrons 510 and determining the amount of neutrons emitted from the core based, at least in part, on the determined magnitude of the generated current of electrons 512.

According to some non-limiting aspects, the method 500 of FIG. 5 can further include determining a neutron flux of the nuclear reactor based, at least in part, on the determined amount of neutrons emitted from the core 514 and determining a power output of the nuclear reactor based, at least in part, on the determined neutron flux. In still other non-limiting aspects, the method 500 can include generating a signal associated with the generated current of electrons 518 and transmitting the signal generated by the signal lead to a receiver for further processing 520. However, it shall be appreciated that, according to other non-limiting aspects, the method 500 of FIG. 5 can include any of the steps and/or processes described herein. For example, according to some non-limiting aspects, the method 500 of FIG. 5 can further include any of the processes discussed in relation to the neutron detector 100 of FIG. 1, the chart 200 of FIG. 2, the neutron detector 304, 306, 308 configuration of FIGS. 3A and 3B, or the system 400 of FIG. 4. As such, the method of FIG. 5 is merely illustrative and shall not be limited to the express disclosure presented in discussion of the method 500 of FIG. 5.

Various aspects of the subject matter described herein are set out in the following numbered clauses:

Clause 1: A neutron detector including: a housing defining a cavity, wherein the housing is configured to permit an amount of neutrons emitted from a core of a nuclear reactor to enter the cavity; an amount of a neutron sensitive material dispositioned within the cavity, wherein the neutron sensitive material is configured to generate and emit gamma rays upon interacting with the amount of neutrons; and an amount of electron emissive material configured to generate and emit a current of electrons upon interacting with the emitted gamma rays, wherein the current of electrons is indicative of the amount of neutrons emitted from the core of the nuclear reactor.

Clause 2: The neutron detector according to clause 1, wherein the electron emissive material is dispositioned between the housing and the neutron sensitive material.

Clause 3: The neutron detector according to clauses 1 or 2, further including an electrically insulating material is dispositioned between the electron emissive material and the housing.

Clause 4: The neutron detector according to any of clauses 1-3, wherein the current of electrons is configured to traverse through the cavity, wherein the electrically insulating material is configured to allow the traversal of the current of electrons, and wherein the housing is configured to prevent the traversal of the current of electrons.

Clause 5: The neutron detector according to any of clauses 1-4, further including a signal lead configured to generate a signal associated with the current of electrons.

Clause 6: The neutron detector according to any of clauses 1-5, wherein the signal lead is configured to electrically power a transmitter via the current of electrons, and wherein the transmitter configured to transmit the signal generated by the signal lead.

Clause 7: The neutron detector according to any of clauses 1-6, wherein the transmission is wireless.

Clause 8: The neutron detector according to any of clauses 1-7, wherein the amount of neutron sensitive material is determined based, at least in part, on a desired sensitivity of the neutron detector.

Clause 9: The neutron detector according to any of clauses 1-8, wherein the amount of neutron sensitive material is determined based, at least in part, on a desired length of life of the neutron detector.

Clause 10: The neutron detector according to any of clauses 1-9, wherein the amount of electron emissive material is determined based, at least in part, on a desired sensitivity of the neutron detector.

Clause 11: The neutron detector according to any of clauses 1-10, wherein the amount of electron emissive material is determined based, at least in part, on a desired length of life of the neutron detector.

Clause 12: A system configured to detect neutrons, including: a neutron detector including: a housing defining a cavity, wherein the housing is configured to permit an amount of neutrons emitted from a core of a nuclear reactor to enter the cavity; an amount of a neutron sensitive material dispositioned within the cavity, wherein the neutron sensitive material is configured to generate and emit gamma rays upon interacting with the amount of neutrons; and an amount of electron emissive material configured to generate and emit a current of electrons upon interacting with the emitted gamma rays, wherein the current of electrons is indicative of the amount of neutrons emitted from the core of the nuclear reactor; and a signal lead configured to generate a signal associated with the current of electrons; and a monitoring subsystem communicably coupled to the neutron detector, wherein the monitoring subsystem includes a control circuit configured to: receive the signal generated by the signal lead; determine a magnitude of the current of electrons based, at least in part, on the signal received from the signal lead; and determine the amount of neutrons emitted from the core of the nuclear reactor based, at least in part, on the determined magnitude of the current of electrons.

Clause 13: The system according to clause 12, wherein the control circuit is further configured to: determine a neutron flux of the nuclear reactor based, at least in part, on the determined amount of neutrons emitted from the core of the nuclear reactor; and determine a power output of the nuclear reactor based, at least in part, on the determined neutron flux of the nuclear reactor.

Clause 14: The system according to clauses 12 or 13, further including a transmitter electrically coupled to the signal lead, wherein the transmitter is configured to transmit the signal generated by the signal lead.

Clause 15: The system according to any of clauses 12-14, wherein the signal lead is configured to electrically power the transmitter via the current of electrons.

Clause 16: The system according to any of clauses 12-15, wherein the electron emissive material is dispositioned between the housing and the neutron sensitive material.

Clause 17: The system according to any of clauses 12-16, wherein the neutron detector further includes an electrically insulating material is dispositioned between the electron emissive material and the housing.

Clause 18: A method of detecting neutrons emitted from a core of a nuclear reactor, the method including: causing an interaction between an amount of neutrons emitted from the core and a neutron sensitive material; generating, via the interaction, gamma rays to be emitted towards an electron emissive material; causing an interaction between the emitted gamma rays and the electron emissive material; generating, via the interaction, a current of electrons indicative of the amount of neutrons emitted from the core; determining a magnitude of the generated current of electrons; and determining the amount of neutrons emitted from the core based, at least in part, on the determined magnitude of the generated current of electrons.

Clause 19: The method according to clause 18, further including: determining a neutron flux of the nuclear reactor based, at least in part, on the determined amount of neutrons emitted from the core; and determining a power output of the nuclear reactor based, at least in part, on the determined neutron flux.

Clause 20: The method according to either of clauses 18 or 19, further including generating a signal associated with the generated current of electrons; and transmitting the signal generated by the signal lead to a receiver for further processing.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative aspects. The aspects described herein are understood as providing illustrative features of varying detail of various aspects of the disclosed invention; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the disclosed invention. Accordingly, it will be recognized by persons having ordinary skill in the art that various substitutions, modifications or combinations of any of the exemplary aspects may be made without departing from the scope of the invention. In addition, persons skilled in the art will recognize, or be able to ascertain using no more than routine experimentation, many equivalents to the various aspects of the invention described herein upon review of this specification. Thus, the invention is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor comprising one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein, "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

What is claimed is:

1. A neutron detector comprising:
a housing defining a cavity, wherein the housing is configured to permit an amount of neutrons emitted from a core of a nuclear reactor to enter the cavity, and wherein the housing is configured to prevent a traversal of electrons;
an amount of a neutron sensitive material dispositioned within the cavity, wherein the neutron sensitive material is configured to generate and emit gamma rays upon interacting with the amount of neutrons; and
an amount of electron emissive material configured to generate and emit a current of electrons upon interacting with the emitted gamma rays, wherein the current of electrons is indicative of the amount of neutrons emitted from the core of the nuclear reactor.

2. The neutron detector of claim 1, wherein the electron emissive material is dispositioned between the housing and the neutron sensitive material.

3. The neutron detector of claim 2, further comprising an electrically insulating material is dispositioned between the electron emissive material and the housing.

4. The neutron detector of claim 3, wherein the current of electrons is configured to traverse through the cavity, and wherein the electrically insulating material is configured to allow the traversal of the current of electrons.

5. The neutron detector of claim 4, further comprising a signal lead configured to generate a signal associated with the current of electrons.

6. The neutron detector of claim 5, wherein the signal lead is configured to electrically power a transmitter via the current of electrons, and wherein the transmitter configured to transmit the signal generated by the signal lead.

7. The neutron detector of claim 6, wherein the transmission is wireless.

8. The neutron detector of claim 1, wherein the amount of neutron sensitive material is determined based, at least in part, on a desired sensitivity of the neutron detector.

9. The neutron detector of claim 1, wherein the amount of neutron sensitive material is determined based, at least in part, on a desired length of life of the neutron detector.

10. The neutron detector of claim 1, wherein the amount of electron emissive material is determined based, at least in part, on a desired sensitivity of the neutron detector.

11. The neutron detector of claim 1, wherein the amount of electron emissive material is determined based, at least in part, on a desired length of life of the neutron detector.

12. A system configured to detect neutrons, comprising:
a neutron detector comprising:
a housing defining a cavity, wherein the housing is configured to permit an amount of neutrons emitted from a core of a nuclear reactor to enter the cavity, and wherein the housing is configured to prevent a traversal of electrons;

an amount of a neutron sensitive material dispositioned within the cavity, wherein the neutron sensitive material is configured to generate and emit gamma rays upon interacting with the amount of neutrons; and an amount of electron emissive material configured to generate and emit a current of electrons upon interacting with the emitted gamma rays, wherein the current of electrons is indicative of the amount of neutrons emitted from the core of the nuclear reactor; and a signal lead configured to generate a signal associated with the current of electrons; and a monitoring subsystem communicably coupled to the neutron detector, wherein the monitoring subsystem comprises a control circuit configured to:

receive the signal generated by the signal lead;

determine a magnitude of the current of electrons based, at least in part, on the signal received from the signal lead; and determine the amount of neutrons emitted from the core of the nuclear reactor based, at least in part, on the determined magnitude of the current of electrons.

13. The system of claim 12, wherein the control circuit is further configured to:

determine a neutron flux of the nuclear reactor based, at least in part, on the determined amount of neutrons emitted from the core of the nuclear reactor; and determine a power output of the nuclear reactor based, at least in part, on the determined neutron flux of the nuclear reactor.

14. The system of claim 12, further comprising a transmitter electrically coupled to the signal lead, wherein the transmitter is configured to transmit the signal generated by the signal lead.

15. The system of claim 14, wherein the signal lead is configured to electrically power the transmitter via the current of electrons.

16. The neutron detector of claim 12, wherein the electron emissive material is dispositioned between the housing and the neutron sensitive material.

17. The system of claim 16, wherein the neutron detector further comprises an electrically insulating material is dispositioned between the electron emissive material and the housing.

18. A method of detecting neutrons emitted from a core of a nuclear reactor, the method comprising:

causing an interaction between an amount of neutrons emitted from the core and a neutron sensitive material;

generating, via the interaction, gamma rays to be emitted towards an electron emissive material;

causing an interaction between the emitted gamma rays and the electron emissive material;

generating, via the interaction, a current of electrons indicative of the amount of neutrons emitted from the core;

determining a magnitude of the generated current of electrons; and determining the amount of neutrons emitted from the core based, at least in part, on the determined magnitude of the generated current of electrons.

19. The method of claim 18, further comprising:

determining a neutron flux of the nuclear reactor based, at least in part, on the determined amount of neutrons emitted from the core; and determining a power output of the nuclear reactor based, at least in part, on the determined neutron flux.

20. The method of claim 18, further comprising:

generating a signal associated with the generated current of electrons; and transmitting the signal generated by the signal lead to a receiver for further processing.

* * * * *